I. HYDE.

Combined Water-Wheels and Sewing-Machines.

Reissued Oct. 7, 1873.

No. 5,590.

Witnesses.
R. Campbell
J. N. Campbell

Inventor
Isaac Hyde
by
Munn, Prentiss & Sawyer.

UNITED STATES PATENT OFFICE.

ISAAC HYDE, OF OAKLAND, ASSIGNOR TO OSCAR J. BACKUS, OF SAN FRANCISCO, CALIFORNIA.

IMPROVEMENT IN COMBINED WATER-WHEELS AND SEWING-MACHINES.

Specification forming part of Letters Patent No. 131,616, dated September 24, 1872; reissue No. 5,590, dated October 7, 1873; application filed June 5, 1873.

*To all whom it may concern:*

Be it known that I, ISAAC HYDE, of Oakland, in the county of Alameda and State of California, have invented a Combined Water-Wheel and Sewing-Machine; and I do hereby declare that the following is a full, clear, and exact description thereof, reference being had to the accompanying drawings making part of this specification, in which—

Figure 1:
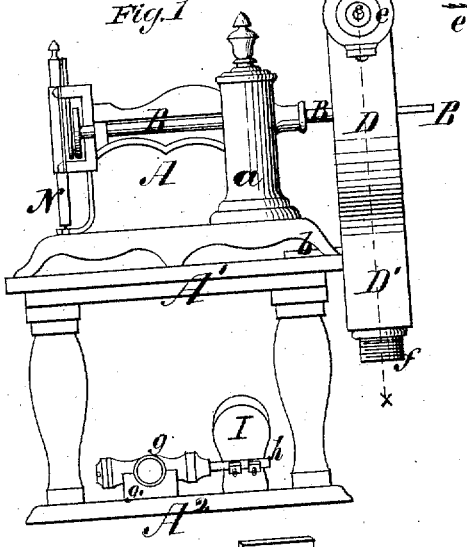
Figure 2:
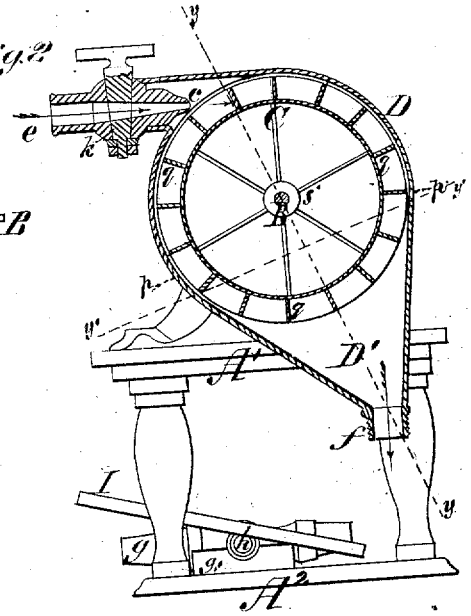
Figure 3:
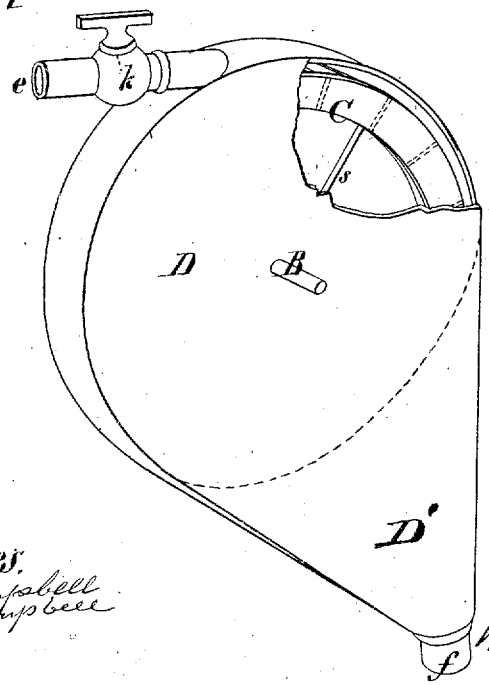

Figure 1 is a front elevation of a combined sewing-machine and water-wheel. Fig. 2 is an end view of the sewing-machine table, showing the water-wheel and its case in section, the plane of the section being indicated on Fig. 1 by a dotted line, *x x*. Fig. 3 is a perspective view of the wheel-case, one side of which is partly broken away to show the wheel therein.

Similar letters of reference indicate corresponding parts in the several figures.

The object of my invention is to combine in one and the same machine a water-wheel motor and a sewing-machine, in such manner that water from a hydrant, the service-pipes of a building, or from some elevated source, can be practically employed to drive the main shaft of the sewing-machine, as will be hereinafter explained.

The following description of my invention will enable others skilled in the art to understand it.

In the accompanying drawings, A represents a sewing-machine of a well-known kind, which is supported upon a table-top, $A^1$. B represents the horizontal driving-shaft of the machine A, for imparting movement to the needle-bar N, in any suitable way, which shaft is extended out from the standard *a*, for the purpose of serving also as the shaft of a water-wheel, C. This water-wheel C is constructed with radial buckets *q*, and its bucket-rim is secured to its hub *s'* by means of spokes *s*, as shown in Fig. 2. The wheel is made light and strong, and is arranged to turn in a vertical plane, for reasons which I shall hereinafter explain. D represents the casing for inclosing the wheel, which is constructed with a bracket, *b*, on one side, by means of which it is supported upon and secured rigidly on the table-top, as shown in Fig. 1. This casing is also constructed with a pocket or spent-water receiver, D', an induction-nozzle, *e*, and a discharging-nozzle, *f*. The pocket D' is an extension of the casing, and converges from points *p p* down to the nozzle *f*, through which latter the waste water escapes from the pocket. The pocket D' extends on opposite sides of a plane about midway between a point at which the buckets begin to discharge the water into the pocket and a point at which the buckets leave the pocket, as illustrated in Fig. 2 by the dotted lines *y y*, for the reason that, in practice, it is necessary to give the wheel C a very high speed; and if the pocket were arranged only on one side of said plane, a large quantity of the water which naturally adheres to the buckets for a time would be carried up by the buckets into the circular portion of the case, and, falling back on the buckets, would react upon the wheel and retard its rotation; but by extending the mouth of the pocket on opposite sides of the plane *y y* it will catch the water on both sides of this plane. The pocket D' is of such capacity that it will carry off the waste water as rapidly as it falls from the wheel, and thus prevent this water reacting on the buckets, which it would do if it rose to a level with them. The induction-pipe *e*, which communicates with any convenient water source from which to obtain power, terminates in the injecting-nozzle *c*, which is provided with a cock-plug, *k*, and constructed with a small aperture through it for injecting against the buckets *q* a minute stream of water. The wheel C is thus driven by the percussive force of water, and a comparative small expenditure of water is the result. The water which supplies the motor is conducted through a cock, *g*, on its way thereto, which cock is supported by standards *g'* upon a board, $A^2$, which board constitutes the base of the sewing-machine table, and which is secured to the legs thereof, as shown in Figs. 1 and 2. The plug *h* of the cock is extended out, and has secured to it a pedal, I, on which the foot of an operator is placed when she wishes to let on or cut off the supply of water to the motor.

It will be seen that the wheel C rotates in a vertical plane—that is to say, in a plane which is at right angles to the driving-shaft B. This position of the wheel enables me to communicate motion directly to said driving-shaft, and renders unnecessary the employment of gearing between the motive power and this shaft. Such a wheel is supported with uniformity upon its bearings on both its sides, and consequently will run freely and with that degree of precision which is required for driving a sewing-machine. By means of such a wheel I economize space laterally, and also am enabled to prevent any rise of water in the wheel-case from overflowing the buckets and reacting against them. I also render unnecessary the stuffing of either one of the wheel-shaft bearings, which, if done, would impair, if not wholly destroy, the utility of the wheel as a fly or balance wheel for the sewing-machine; and I also diminish the friction due to the passage of the water through the wheel-case, and, to a great extent, make percussive force alone available to drive the wheel.

Having described my invention, what I claim as new, and desire to secure by Letters Patent, is—

1. In combination with the water-wheel C and pipe *e*, the cock *g*, with a horizontal operating-rod, *h*, and foot-lever or pedal I, substantially as and for the purpose described.

2. The pocket D′, constructed to receive water falling from the wheel C on both sides of the plane *y y*, substantially as described.

3. The driving-shaft B, connected with a needle-bar at one end, and carrying on its opposite end an incased water-wheel, substantially as described.

4. The treadle-cock *g* and base-board $A^2$, applied to a sewing-machine table, and so as to be movable with it, substantially as described.

5. A rotary motor consisting of a water-wheel and its casing, sustained both by the frame or table of the sewing-machine and by a shaft of the operating mechanism of said machine, substantially as described.

6. A vertically-revolving water-wheel, in combination with an inclosing-case, which has a projecting spent-water pocket, D′, to prevent the spent water from acting upon the wheel, substantially as described.

ISAAC HYDE.

Witnesses:
JOHN L. BOONE,
A. T. DEWEY.